US012556526B2

(12) United States Patent
Small

(10) Patent No.: US 12,556,526 B2
(45) Date of Patent: Feb. 17, 2026

(54) SYSTEMS AND METHODS FOR ORCHESTRATING WEB AUTHENTICATION REQUESTS

(71) Applicant: Cisco Technology, Inc., San Jose, CA (US)

(72) Inventor: Robert Jacob Linial Small, Ann Arbor, MI (US)

(73) Assignee: Cisco Technology, Inc., San Jose, CA (US)

( * ) Notice: Subject to any disclaimer, the term of this patent is extended or adjusted under 35 U.S.C. 154(b) by 63 days.

(21) Appl. No.: 18/592,630

(22) Filed: Mar. 1, 2024

(65) Prior Publication Data

US 2025/0279987 A1 Sep. 4, 2025

(51) Int. Cl.
*H04L 9/40* (2022.01)
(52) U.S. Cl.
CPC .................................. *H04L 63/08* (2013.01)
(58) Field of Classification Search
CPC . H04L 63/08; H04L 63/0853; H04L 63/0884; H04L 67/02; H04L 63/0892
See application file for complete search history.

(56) References Cited

U.S. PATENT DOCUMENTS

| 8,984,640 | B1 * | 3/2015 | Emigh | H04L 51/212 726/13 |
| 9,043,793 | B1 * | 5/2015 | Field | G06Q 10/10 718/100 |
| 9,059,987 | B1 * | 6/2015 | Lofland | H04L 63/0815 |
| 9,491,175 | B2 * | 11/2016 | Oberheide | H04L 63/0815 |
| 10,075,437 | B1 * | 9/2018 | Costigan | H04L 9/006 |
| 10,348,797 | B1 * | 7/2019 | Burgin | G06F 16/986 |
| 10,826,703 | B1 * | 11/2020 | Shipley | G06F 9/54 |
| 10,965,683 | B1 * | 3/2021 | Castonguay | G06F 21/40 |
| 10,972,458 | B1 * | 4/2021 | Gaeta | G06F 21/32 |

(Continued)

FOREIGN PATENT DOCUMENTS

CN 102448061 A 5/2012

OTHER PUBLICATIONS

International Search Report and Written Opinion for International Application No. PCT/US2025/015742, mailed May 9, 2025, 13 Pages.

*Primary Examiner* — Aravind K Moorthy
(74) *Attorney, Agent, or Firm* — Baker Botts L.L.P.

(57) ABSTRACT

In one embodiment, a method uses a web browser to receive an authentication request for an application from an authentication prompt of a client device. The method identifies an authentication protocol associated with web browser of the client device and use the authentication prompt to fetch a first challenge from an authentication service associated with the client device. The method uses the authentication prompt to communicate a subscribe to the authentication service and use a localhost to communicate to the application to provide the first challenge. In response to receiving the first challenge, the method uses one or more native Application Programming Interfaces (APIs) to determine an assertion associated with the authentication request and the authentication protocol. The method validates the assertion associated with the authentication request. In response to determining the assertion is valid, the method approves the authentication request.

17 Claims, 5 Drawing Sheets

(56) References Cited

U.S. PATENT DOCUMENTS

| | | | |
|---|---|---|---|
| 11,068,866 B1* | 7/2021 | Hecht | G06Q 20/18 |
| 11,134,117 B1* | 9/2021 | Farhangi | G06F 16/95 |
| 11,805,127 B1* | 10/2023 | Sundar | H04L 63/0884 |
| 11,924,637 B1* | 3/2024 | Holman | H04W 12/64 |
| 11,962,663 B1* | 4/2024 | Threlkeld | G06F 16/24568 |
| 12,067,637 B1* | 8/2024 | Ravi | G06Q 50/265 |
| 12,346,936 B2* | 7/2025 | Lim | G06Q 30/0271 |
| 2003/0005134 A1* | 1/2003 | Martin | H04L 67/51 |
| | | | 709/229 |
| 2003/0187731 A1* | 10/2003 | Takakura | G06Q 30/0223 |
| | | | 705/14.24 |
| 2005/0198326 A1* | 9/2005 | Schlimmer | H04L 67/5682 |
| | | | 709/229 |
| 2005/0228992 A1* | 10/2005 | Mizikovsky | H04L 63/08 |
| | | | 713/168 |
| 2006/0129817 A1* | 6/2006 | Borneman | H04L 67/53 |
| | | | 713/170 |
| 2008/0109884 A1* | 5/2008 | Kulkarni | G06F 21/31 |
| | | | 726/5 |
| 2008/0170693 A1* | 7/2008 | Spies | H04L 9/0891 |
| | | | 380/277 |
| 2009/0046723 A1* | 2/2009 | Rahman | H04L 41/0695 |
| | | | 370/395.31 |
| 2009/0144810 A1* | 6/2009 | Gilboy | G06F 16/951 |
| | | | 726/5 |
| 2009/0328178 A1* | 12/2009 | McDaniel | H04L 9/3271 |
| | | | 726/5 |
| 2011/0145900 A1* | 6/2011 | Chern | H04L 63/0884 |
| | | | 726/7 |
| 2011/0161232 A1* | 6/2011 | Brown | G06Q 20/3278 |
| | | | 705/76 |
| 2011/0202988 A1* | 8/2011 | Otranen | H04L 9/3213 |
| | | | 726/8 |
| 2011/0202989 A1* | 8/2011 | Otranen | H04W 12/068 |
| | | | 726/8 |
| 2011/0283110 A1* | 11/2011 | Dapkus | H04L 9/3234 |
| | | | 713/182 |
| 2011/0307938 A1* | 12/2011 | Reeves, Jr. | H04L 63/1483 |
| | | | 726/3 |
| 2012/0110318 A1* | 5/2012 | Stone | H04L 9/3234 |
| | | | 713/150 |
| 2012/0179903 A1* | 7/2012 | Arnold | H04L 9/3247 |
| | | | 713/155 |
| 2013/0007867 A1* | 1/2013 | Sowatskey | H04L 63/0815 |
| | | | 726/8 |
| 2014/0269762 A1* | 9/2014 | Voit | H04L 45/52 |
| | | | 370/466 |
| 2016/0094531 A1* | 3/2016 | Unnikrishnan | H04L 63/08 |
| | | | 726/7 |
| 2016/0248803 A1* | 8/2016 | O'Connell | G06F 16/24575 |
| 2016/0269403 A1* | 9/2016 | Koutenaei | H04L 63/102 |
| 2016/0314462 A1* | 10/2016 | Hong | H04L 63/083 |
| 2017/0317997 A1* | 11/2017 | Smith | H04L 9/3247 |
| 2018/0109430 A1* | 4/2018 | Quintas | H04L 43/04 |
| 2018/0152439 A1* | 5/2018 | Hande | H04L 63/083 |
| 2018/0152440 A1* | 5/2018 | Hande | H04L 63/0815 |
| 2018/0219923 A1* | 8/2018 | Berger | G06Q 10/101 |
| 2019/0020682 A1* | 1/2019 | Edwards | H04L 51/18 |
| 2019/0273607 A1* | 9/2019 | Van Der Velden | H04L 9/088 |
| 2019/0347384 A1* | 11/2019 | Smith | H04L 63/1491 |
| 2020/0099676 A1* | 3/2020 | Desarda | H04L 63/0815 |
| 2020/0128020 A1* | 4/2020 | Abduljaber | H04L 63/10 |
| 2020/0186520 A1* | 6/2020 | Oberheide | G06Q 20/356 |
| 2020/0241962 A1* | 7/2020 | Dain | G06F 16/1748 |
| 2020/0396220 A1* | 12/2020 | McKegney | H04L 63/0884 |
| 2022/0353084 A1* | 11/2022 | Venable | H04L 9/3247 |
| 2023/0006986 A1 | 1/2023 | Murthy et al. | |
| 2023/0017382 A1 | 1/2023 | Li et al. | |
| 2023/0138188 A1* | 5/2023 | Ben-Ari | H04L 63/08 |
| | | | 705/2 |
| 2023/0155998 A1 | 5/2023 | Gero | |
| 2023/0164178 A1* | 5/2023 | Singh | H04L 63/101 |
| | | | 726/4 |
| 2023/0171238 A1* | 6/2023 | Stocker | H04L 63/083 |
| | | | 726/8 |
| 2023/0171252 A1* | 6/2023 | Stocker | H04L 63/0884 |
| | | | 726/5 |
| 2023/0185893 A1* | 6/2023 | Suraparaju | H04L 63/0861 |
| | | | 726/8 |
| 2023/0215239 A1* | 7/2023 | Paterson | G07F 13/065 |
| | | | 700/237 |
| 2023/0319040 A1* | 10/2023 | Backus | G06Q 30/0609 |
| | | | 726/6 |
| 2024/0007853 A1* | 1/2024 | Singh | H04W 4/06 |
| 2024/0064140 A1* | 2/2024 | Young | G16Y 30/10 |
| 2024/0070251 A1* | 2/2024 | Maizels | G10L 13/02 |
| 2024/0080666 A1* | 3/2024 | Balmakhtar | H04W 12/062 |
| 2024/0259190 A1* | 8/2024 | Karthikeyan | G06Q 30/0225 |
| 2024/0273060 A1* | 8/2024 | Mansfield | H04L 67/55 |
| 2025/0190536 A1* | 6/2025 | Shachor | G06F 21/44 |
| 2025/0190978 A1* | 6/2025 | Clayton-Smith | G06Q 20/3221 |

* cited by examiner

SYSTEMS AND METHODS FOR ORCHESTRATING WEB AUTHENTICATION REQUESTS

TECHNICAL FIELD

The present disclosure relates generally to an apparatus and method for a mobile application running locally on a mobile device for orchestrating one or more authentication requests on behalf of a web browser, and in particular, using the mobile application to authenticate the web browser to protect against attacker-in-the-middle (AITM) attacks.

BACKGROUND

Electronic computing systems, such as mobile computing devices or servers. provide many useful and powerful services to improve business for companies and personal life for individuals. In recent years, electronic computing systems have implemented complex software components to effectively exchange data amongst a large number of nodes (e.g., clients, mobile computing devices, servers, etc.) within a network using various gateways (e.g., routers, etc.) and communications protocols. The software components are particularly susceptible to a cybersecurity attack associated with security breaches, data exfiltration, identity theft, fraud, and/or other types of unauthorized access to such communications. Thus, the number of phishing attacks associated with electronic computing systems also significantly increases. Traditional phishing attacks often duplicate/clone a website or attempt to drop malware to compromise and steal protected data and assets, such as personal or confidential information, associated with an account or service from a phished victim. In order to prevent a malicious entity from gaining access to the protected data and assets, cybersecurity infrastructure is critical for detecting, identifying, tracing, and analyzing each critical component or service that is incorporated into one or more high-risk components of the electronic computing devices. For example, electronic computing systems may use primary authentication or multi-factor authentication (MFA) to mitigate traditional phishing attacks by adding an extra layer of protection required to access the account or service. As another example, electronic computing systems may use a threat protection solution to mitigate cases where phishing drops malware to compromise the machine.

Web Authentication (WebAuthn) is a passwordless application programming interface (API) authentication protocol, which is a proposed standard by the World Wide Web Consortium (W3C) to stop one or more AITM attacks. In some embodiments, WebAuthn includes an API which allows a mobile server to register and authenticate an end user using public key cryptography rather than a password. In particular, WebAuthn may be configured to generate a credential using a private-public key pair for a website. Thus, WebAuthn may be used to verify a website which the end user is logging into is the correct website. Likewise, WebAuthn may work within a web browser to register, manage, and authenticate users. However, WebAuthn adoption is very low due to poor user experiences caused by inconsistent security settings for different websites. For example, the WebAuthn protocol is not supported by Opera, Linux, Internet Explorer, Webviews, and older versions of other major web browsers.

AITM attacks are a type of unauthorized access for a cyberattack where an attacker secretly relays and possibly alters the communications between two parties who believe that they are directly communicating with each other, as the attacker has inserted themselves between the two parties. For example. a node or other agent redirects or otherwise intercepts communications between two other nodes within the computing environment. Such AITM attacks can go unnoticed for long periods of time which, in turn, allows the attackers to obtain sensitive and damaging information such as payment credentials and the like. As another example, an AITM attacker sends a link to a phishing site to a true end user to steal sensitive credentials and bypass traditional security measures, such as the primary authentication or multiple-factor authentication, because the true end-user authenticates against a fake login page in the phishing site, instead of a valid site.

DESCRIPTION OF EXAMPLE EMBODIMENTS

Overview

Figure 1:
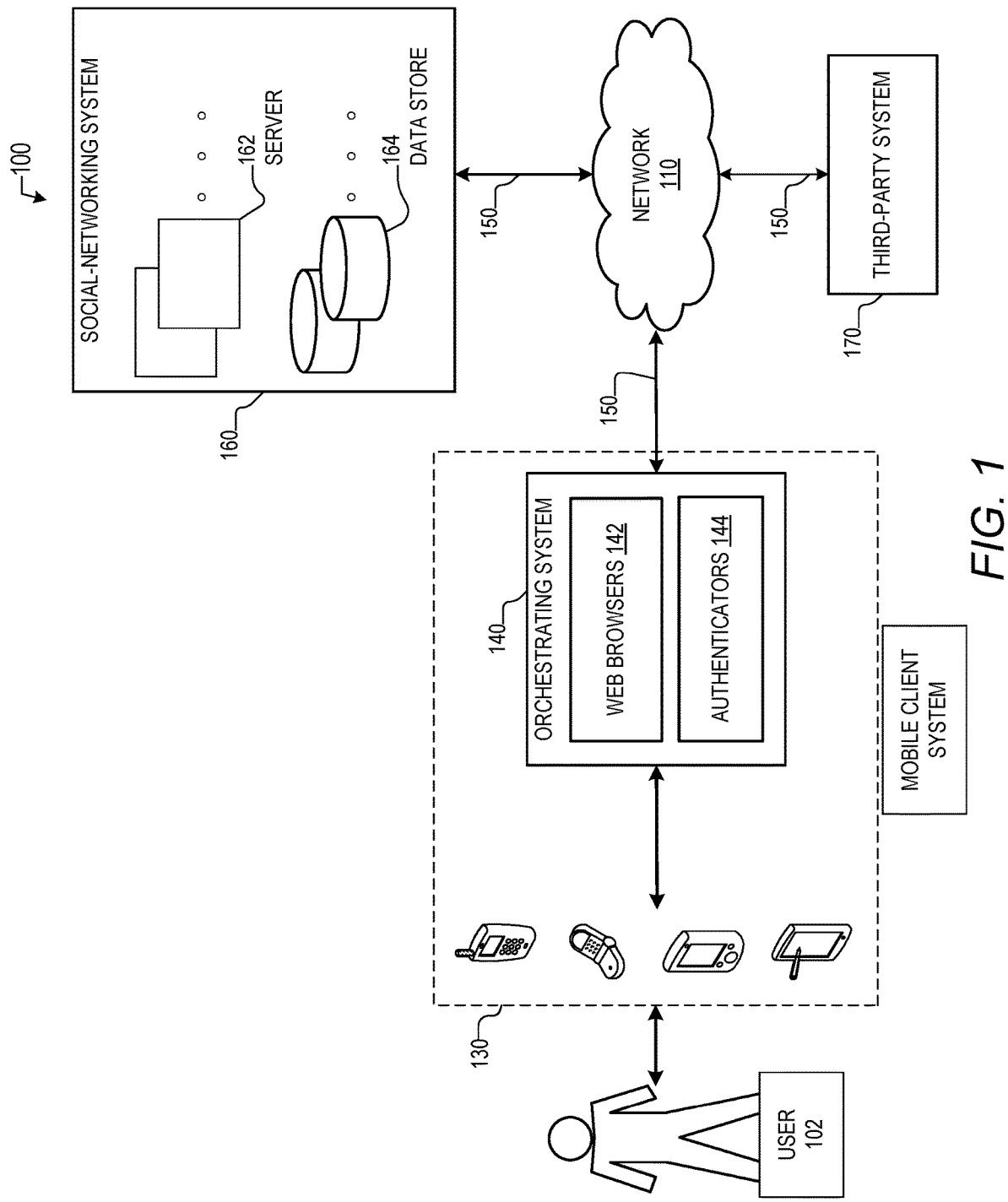
FIG. 1 illustrates a network environment system associated with a client system for use in a product, in accordance with certain embodiments.

In one or more embodiments, an apparatus may include one or more processors and one or more computer-readable non-transitory storage media comprising instructions that, when executed by the one or more processors, cause one or more components of the apparatus to perform operations. The operations include using a web browser to receive an authentication request for an application from an authentication prompt of a client device. The operations further include identifying an authentication protocol associated with web browser of the client device. The operations further include using the authentication prompt to fetch a first challenge from an authentication service associated with the client device. The operations further include using the authentication prompt to communicate a subscribe waiting for a response to the authentication service. The operations further include using a localhost to communicate to the application to provide the first challenge. In response to receiving the first challenge, the operations further include using one or more native Application Programming Interfaces (APIs) to determine an assertion associated with the authentication request and the authentication protocol. The operations further include validating the assertion associated with the authentication request. In response to determining the assertion is valid, the operations further include approving the authentication request. In response to determining the assertion is invalid, the operations further include rejecting the authentication request.

In one or more embodiments, in response to receiving the first challenge, the operations further include validating an origin header of the authentication request from the client device based on a plurality of Uniform Resource Locators (URLs) in a trusted domain. In response to determining the origin header of the authentication request is valid, the operations further include obtaining a credential associated with the authentication request from the client device. The operations further include determining the assertion associated with the authentication request. In response to determining the origin header of the authentication request is invalid, the operations further include rejecting the authentication request. In response to receiving the authentication request, the operations further include determining an availability of the authentication protocol associated with the web browser of the client device. In response to determining that the authentication protocol is unavailable, the operations further include using an authentication prompt to receive a second challenge to an authentication service, using an authentication service to communicate the second challenge to the authentication prompt, and using the authentication prompt to communicate the subscribe waiting for the response to the authentication service. In response to determining the assertion is valid, the operations further include using the server to check one or more policies associated with the authentication request. In response to determining the one or more policies are valid, the operations further include using the server to communicate a response of success to the authentication prompt of the client device.

In one or more embodiments, a computer-implemented method, by an apparatus, may include using a web browser to receive an authentication request for an application from an authentication prompt of a client device. The computer-implemented method further includes identifying an authentication protocol associated with web browser of the client device. The computer-implemented method further includes using the authentication prompt to fetch a first challenge from an authentication service associated with the client device. The computer-implemented method further includes using the authentication prompt to communicate a subscribe waiting for a response to the authentication service. The computer-implemented method further includes using a localhost to communicate to the application to provide the first challenge. In response to receiving the first challenge, the computer-implemented method further includes using one or more native APIs to determine an assertion associated with the authentication request. The computer-implemented method further includes validating the assertion associated with the authentication request and the authentication protocol. In response to determining the assertion is valid, the computer-implemented method further includes approving the authentication request. In response to determining the assertion is invalid, the computer-implemented method further includes rejecting the authentication request.

In one or more embodiments, in response to receiving the first challenge, the computer-implemented method further includes validating an origin header of the authentication request from the client device based on a plurality of URLs in a trusted domain. In response to determining the origin header of the authentication request is valid, the computer-implemented method further includes obtaining a credential associated with the authentication request from the client device. The computer-implemented method further includes determining the assertion associated with the authentication request. In response to determining the origin header of the authentication request is invalid, the computer-implemented method further includes rejecting the authentication request. In response to receiving the authentication request, the computer-implemented method further includes determining an availability of the authentication protocol associated with the web browser of the client device. In response to determining that the authentication protocol is unavailable, the computer-implemented method further includes using an authentication prompt to receive a second challenge to an authentication service, using an authentication service to communicate the second challenge to the authentication prompt, and using the authentication prompt to communicate the subscribe waiting for the response to the authentication service. In response to determining the assertion is valid, the computer-implemented method further includes using the server to check one or more policies associated with the authentication request. In response to determining the one or more policies are valid, the computer-implemented method further includes using the server to communicate a response of success to the authentication prompt of the client device.

In one or more embodiments, a non-transitory computer-readable medium may include instructions that are configured, when executed by a processor, to perform operations. The operations include using a web browser to receive an authentication request for an application from an authentication prompt of a client device. The operations further include identifying an authentication protocol associated with web browser of the client device. The operations further include using the authentication prompt to fetch a first challenge from an authentication service associated with the client device. The operations further include using the authentication prompt to communicate a subscribe waiting for a response to the authentication service. The operations further include using a localhost to communicate to the application to provide the first challenge. In response to receiving the first challenge, the operations further include using one or more native APIs to determine an assertion associated with the authentication request and the authentication protocol. The operations further include validating the assertion associated with the authentication request. In response to determining the assertion is valid, the operations further include approving the authentication request. In response to determining the assertion is invalid, the operations further include rejecting the authentication request.

In one or more embodiments, in response to receiving the first challenge, the operations further include validating an origin header of the authentication request from the client device based on a plurality of URLs in a trusted domain. In response to determining the origin header of the authentication request is valid, the operations further include obtaining a credential associated with the authentication request from the client device. The operations further include determining the assertion associated with the authentication request. In response to determining the origin header of the authentication request is invalid, the operations further include rejecting the authentication request. In response to receiving the authentication request, the operations further include determining an availability of the authentication protocol associated with the web browser of the client device. In response to determining that the authentication protocol is unavailable, the operations further include using an authentication prompt to receive a second challenge to an authentication service, using an authentication service to communicate the second challenge to the authentication prompt, and using the authentication prompt to communicate the subscribe waiting for the response to the authentication service. In response to determining the assertion is valid, the operations further include using the server to check one or more policies associated with the authentication request. In response to determining the one or more policies are valid, the operations further include using the server to communicate a response of success to the authentication prompt of the client device.

Technical advantages of certain embodiments of this disclosure may include one or more of the following. Certain apparatuses and methods described herein may include an orchestrating system which runs locally on a mobile device which is used to orchestrate an authentication request, such as an WebAuthn request, on behalf of a web browser. Thus, WebAuthn may then be used to authenticate the web browser to protect against AITM attacks. In some embodiments, the orchestrating system may be used to check an origin head of the authentication request to verify the authentication request is from a trusted domain. In some embodiments, the orchestrating system may be used to check proximity by proving the authentication request is from an access device which is co-located with or the same as the device which approves the authentication. Other technical advantages will be readily apparent to one skilled in the art from the following figures, descriptions, and claims. Moreover, while specific advantages have been enumerated above, various embodiments may include all, some, or none of the enumerated advantages.

Example Embodiments

In certain embodiments, authentication is a key tool at the center of cybersecurity infrastructure against various cybersecurity attacks, such as phishing, associated with an electronic computing system. In particular, the electronic computing system may be a mobile device, a server, a personal computer, a laptop computer, a cellular telephone, a smartphone, a tablet computer, or an augmented/virtual reality device. For every new session, a user begins on a website to access a server, a user needs to use a web browser of an electronic computing system to undergo an authentication process which exchanges and validates a plurality of Secure Sockets Layer (SSL)/Transport Layer Security (TLS) certificates. SSL/TLS is a protocol or communication rule that allows two or more computer systems, such as the electronic computing system and the server. to talk to each other on the internet safely. SSL/TLS certification may act as digital identity cards which allow the electronic computing system to verify the identity and subsequently establish an encrypted network connection to the server using an SSL/TLS protocol. However, AITM phishing attacks work against primary authentication or MFA. For example, AITM attacks may be performed by a malicious actor in order to get an end user to authenticate against a phishing site, instead of the valid site. AITM attacks are usually associated with suboptimal implementations of SSL/TLS certificates. Thus, the malicious actor may alter an Internet Protocol (IP) address of a website, email address, or device and spoof the entity in order to make the end user think he/she is interacting with a trusted source when he/she is actually passing information to the malicious actor.

In certain embodiments, Web Authentication (WebAuthn) is a passwordless application programming interface (API) authentication protocol that works within a web browser to register, manage, and authenticate users. WebAuthn is a proposed standard by World Wide Web Consortium's (W3C) to stop one or more AITM attacks. In some embodiments, WebAuthn includes an API which allows a mobile server to register and authenticate an end user using public key cryptography rather than a password. In particular, WebAuthn may be configured to generate a credential using a private-public key pair for a website. Thus, WebAuthn may be used to verify a website which the end user is logging into is the correct website. However, the WebAuthn protocol only supports certain platforms (e.g., Window 10 and Android), browsers (e.g., Microsoft Edge, Google Chrome, Mozilla Firefox, and Apple Safari), and authenticator transports (e.g., Universal Serial Bus (USB). Bluetooth Low Energy (BLE), and Near Field Communications (NFC)). Furthermore, WebAuthn is not supported by many other browsers. For example, the WebAuthn protocol is not supported by Opera, Linux, Internet Explorer, Webviews, and older versions of other major browsers. For web browsers which do not support WebAuthn, a mobile application needs to be developed to run locally on a mobile device to orchestrate one or more WebAuthn requests on behalf of the web browser.

In certain embodiments, the mobile application may use an orchestrating system to broker the one or more WebAuthn requests to perform secure authentication by leveraging a localhost listener locally spun up inside of the mobile application of the mobile device for preventing AITM attacks. The mobile application may apply the localhost listener to check an origin header associated with the WebAuthn request using Origin Binding in order to make sure that the origin header matches a trusted uniform resource locator (URL). Furthermore, the mobile application may use the localhost listener to verify proximity of the mobile device by determining the mobile device is co-located with or is the same device as a credential or a device approving the authentication. In response to determining that both the origin of the WebAuthn request and the proximity of the mobile device are valid, the mobile application may approve the WebAuthn request. In other situations, the mobile application may reject the WebAuthn request. Thus, the mobile application may be implemented to WebAuthn to authenticate the web browser to protect against AITM attacks by origin binding an WebAuthn request from the web browser.

FIG. 1 illustrates an example network environment system 100 associated with a mobile client system 130 for use in a product, in accordance with certain embodiments. Network environment 100 includes a user 102, a mobile client system 130, an orchestrating system 140, a social-networking system 160, and a third-party system 170 connected to each other by a network 110. Although FIG. 1 illustrates a particular arrangement of user 102, mobile client system 130, orchestrating system 140, social-networking system 160, third-party system 170, and network 110, this disclosure contemplates any suitable arrangement of user 102, mobile client system 130, orchestrating system 140, social-networking system 160, third-party system 170, and network 110. As an example and not by way of limitation, two or more of user 102, mobile client system 130, orchestrating system 140, social-networking system 160, and third-party system 170 may be connected to each other directly, bypassing network 110. As another example, two or more of user 102, mobile client system 130, orchestrating system 140, social-networking system 160, and third-party system 170 may be physically or logically co-located with each other in whole or in part. Moreover, although FIG. 1 illustrates a particular number of mobile client systems 130, orchestrating system 140, social-networking systems 160, third-party systems 170, and networks 110, this disclosure contemplates any suitable number of mobile client systems 130, orchestrating system 140, social-networking systems 160, third-party systems 170, and networks 110. As an example and not by way of limitation, network environment 100 may include multiple users 102, mobile client systems 130, orchestrating systems 140, social-networking systems 160, third-party systems 170, and networks 110.

In particular embodiments, user 102 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server (or other suitable component(s)) that allows users 102 to opt in to or opt out of having their actions logged by social-networking system 160 or shared with other systems (e.g., third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 160 through blocking, data hashing, anonymization, or other suitable techniques as appropriate. In particular embodiments, third-party system 170 may be a network-addressable computing system that can host aggregate data, in whole or in part, in a predetermined format or provide a service to user 102. Third-party system 170 may generate, store, receive, and send third-party system data, such as, for example, data in a file that is formatted to facilitate automated processing. Third-party system 170 may be accessed by the other components of network environment 100 either directly or via network 110. In particular embodiments, one or more users 102 may use one or more mobile client systems 130 to send one or more WebAuthn requests to orchestrating systems 140 to access, send data to, and receive data from social-networking system 160 or third-party system 170. Mobile client system 130 may access social-networking system 160 or third-party system 170 directly, via network 110, or via a third-party system. As an example and not by way of limitation, mobile client system 130 may access third-party system 170 via social-networking system 160.

This disclosure contemplates any suitable network 110. Network 110 broadly represents any wireline or wireless network, using any of satellite or terrestrial network links, such as public or private cloud on the Internet, ad hoc networks, local area networks (LANs), metropolitan area networks (MANs), wireless LANs (WLANs), wide area networks (WANs), wireless WANs (WWANs), public switched telephone networks (PSTNs), campus networks, internetworks, cellular telephone networks, or combinations thereof. The network 110 may include or comprise the public internet and networked server computers that implement Web2 and/or Web3 technologies. Network 110 may comprise or support intranets, extranets, or virtual private networks (VPNs). Network 110 may also comprise a public switched telephone network (PSTN) using digital switches and call forwarding gear. Network 110 may also comprise a public switched telephone network (PSTN) using digital switches and call forwarding gear. Network 110 may include one or more networks 110.

Links 150 may connect mobile client system 130, orchestrating system 140, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, mobile client system 130 may be an electronic device including hardware, software, or embedded logic components or a combination of two or more such components and capable of carrying out the appropriate functionalities implemented or supported by mobile client system 130. In particular, mobile client system 130 may be any suitable computing device, such as, for example, a personal computer, a laptop computer, a cellular telephone, a smartphone, a tablet computer, or an augmented/virtual reality device. As an example and not by way of limitation, a mobile client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable mobile client systems 130. A mobile client system 130 may enable a network user at mobile client system 130 to access network 110. A mobile client system 130 may enable its user to communicate with other users at other client systems 130.

In particular embodiments, orchestrating system 140 may be an orchestrating component of mobile client system 130 which is coupled to network 110. Orchestrating system 140 may be configured to provide an interface between mobile client systems 130 with a self-signed certificate and a verifying computer in social networking system 160. As an example and not by way of limitation, for every new session user 102 begins on a website to access a server 162 in social network system 160, user 102 needs to use one or more web browsers 142 to undergo an orchestrating process which exchanges and validates a plurality of SSL/TLS certificates. In particular, orchestrating system 140 may be configured to use using an authenticator 144, such as WebAuthn, to perform one or more secure authentications, such as primary authentication, two-factor authentication, etc., by origin binding a WebAuthn request to prevent AITM attacks. Orchestrating system 140 may enable a credential at mobile client system 130 to respond to a request to access a website from a trusted domain. Orchestrating system 140 may enable a network user at mobile client system 130 to access the website by proving that mobile client system 130 is co-located with or the same device as the credential approving the authentication.

In particular embodiments, orchestrating system 140 may include one or more web browsers 142, and may have one or more add-ons, plug-ins, or other extensions. A user at mobile client system 130 may enter a Uniform Resource Locator (URL) or other address directing the one or more web browsers 142 to a particular server (such as server 162, or a server associated with a third-party system 170), and the one or more web browsers 142 may generate a Hyper Text Transfer Protocol (HTTP) request and communicate the HTTP request to server. The server may accept the HTTP request and communicate to mobile client system 130 one or more Hyper Text Markup Language (HTML) files responsive to the HTTP request. Orchestrating system 140 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts, combinations of markup language and scripts, and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, mobile client system 130 may access social-networking system 160 using one or more web browsers 142, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a mobile client system 130, an orchestrating system 140, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take action on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a mobile client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a mobile client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more mobile client systems 130 or one or more third-party system 170 via network 110. The web server may include a mail server or other messaging functionality for receiving and routing messages between social-networking system 160 and one or more mobile client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a mobile client system 130. Information may be pushed to a mobile client system 130 as notifications, or information may be pulled from mobile client system 130 responsive to a request received from mobile client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from mobile client systems 130 associated with users. Advertisement-pricing modules may combine social information, the current time, location information, or other suitable information to provide relevant advertisements, in the form of notifications, to a user.

Although FIG. 1 illustrates a particular number of users 102, networks 110, mobile client systems 130, orchestrating systems 140, web browsers 142, authenticators 144, links 150, social-networking systems 160, servers 162, data stores 164, and third-party systems 170, this disclosure contemplates any suitable number of users 102, networks 110, mobile client systems 130, orchestrating systems 140, web browsers 142, authenticators 144, links 150, social-networking systems 160, servers 162, data stores 164, and third-party systems 170. For example, user 102 may use one or more mobile client systems 130 to access resources from one or more servers 162.

Although FIG. 1 illustrates a particular arrangement of user 102, network 110, mobile client systems 130, orchestrating system 140, web browsers 142, authenticator 144, link 150, social-networking system 160, server 162, data store 164, third-party system 170, this disclosure contemplates any suitable arrangement of user 102, network 110, mobile client systems 130, orchestrating system 140, web browsers 142, authenticator 144, link 150, social-networking system 160, server 162, data store 164, third-party system 170.

Although FIG. 1 describes and illustrates particular components, devices, or systems carrying out particular actions, this disclosure contemplates any suitable combination of any suitable components, devices, or systems carrying out any suitable actions. For example, user 102 may use one or more mobile client systems 130 to access resources from one or more servers 162.

Figure 2:
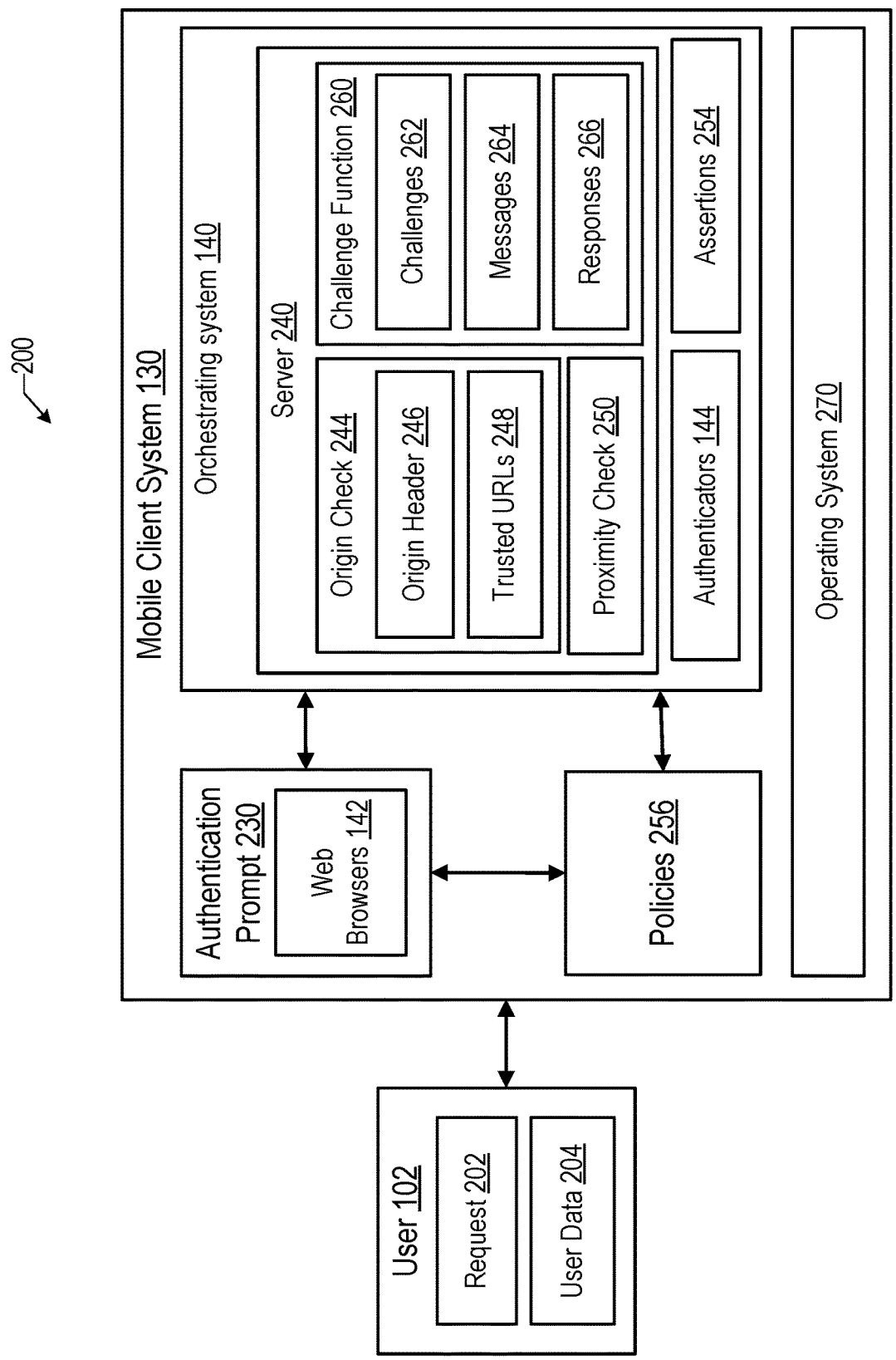
FIG. 2 illustrates a request control system for brokering a plurality of authentication requests, in accordance with certain embodiments.

FIG. 2 illustrates an example request control system 200 for brokering a plurality of authentication requests, in accordance with certain embodiments. In particular, the plurality of authentication requests may be generated using a WebAuthn protocol associated with a client device, such as mobile client device 130. In some embodiments, request control system 200 may include user 102 and mobile client device 130. In some embodiments, mobile client device 130 may include an interactive, browser-based authentication interface, such as authentication prompt 230. In particular, authentication prompt 230 may be programmed to use one or more web browsers 142 to receive a particular WebAuthn request, such as request 202, from user 102. In particular, the particular WebAuthn request may be conveyed via the combination of HTTP, WebAuthn APIs, and platform-specific communications channel between user 102 and an authenticator, such as authenticators 144. For the particular WebAuthn request, the one or more web browsers 142 may be used to generate an HTTP request which is subject to an identified WebAuthn protocol associated with mobile client device 130. In particular, user 102 may click to choose how to verify an authentication of user 102 by sending the particular WebAuthn request to authentication prompt 230 associated with mobile client device 130. In response to receiving the particular WebAuthn request, mobile client device 130 may be programmed to initiate orchestrating system 140 to perform secure authentication, such as multi-factor authentication (MFA), and Origin Binding for the particular WebAuthn request. Likewise, request control system 200 may run locally on mobile device 130 to orchestrate a plurality of WebAuthn requests on behalf of the one or more web browsers 142. As a result, orchestrating system 140 may implement WebAuthn to authenticate the plurality of WebAuthn requests on behalf of the one or more web browsers 142 to protect against AITM attacks by verifying the plurality of WebAuthn requests from the one or more web browsers 142 are origin bound.

In some embodiments, in response to receiving the particular WebAuthn request from user 102, mobile client system 130 may be programmed to implement authentication prompt 230 to trigger an operation to determine if WebAuthn is unavailable for one or more web browsers 142 on mobile client system 130. When the one or more web browsers 142 do not support WebAuthn, mobile client system 130 may be programmed to implement orchestrating system 140 to authenticate the particular WebAuthn request on behalf of the one or more web browsers 142. In particular, mobile client system 130 may use authentication prompt 230 to fetch a challenge, such as challenges 262, from a server, such as server 240, on mobile client system 130. In some embodiments, sever 240 may use a challenge function 260 which includes a challenge management system with automated messaging and a response system. In this context, a "challenge" may be a series of electronic messages, the timing and content of which are mediated by programmed algorithms, which are configured to induce an account or individual to send the particular WebAuthn request in association with a specified account or individual. For example, the challenge may include a buffer of cryptographically random bytes generated on the server. The challenge may be unique for each WebAuthn request to prevent relay attacks.

In some embodiments, authentication prompt 230 may initiate a challenge by interactively communicating with the challenge management system of a localhost, such as server 240, to manage one or more messages 264 and responses 266 associated with the challenge. The challenge is defined in part using a set of challenge criteria, which may include an origin header which includes an origin string of the particular WebAuthn request. Thus, server 240 may return the challenge associated with the particular WebAuthn request to authentication prompt 230. In response to receiving the challenge from server 240, authentication prompt 230 may communicate with server 240 to subscribe to all challenges 262 in server 240 in order to send the one or more messages 264 and responses 266 associated with challenges 262 to authentication prompt 230 for a plurality of WebAuthen requests. As a result, authentication prompt 230 may wait for the response from server 240 for the challenge associated with the particular WebAuthn request. Consequently, orchestrating system 140 may provide the technical benefit of more efficient management of the plurality of WebAuthn requests for mobile client system 130 by reducing the difficulty of detecting the one or more web browsers 142 which do not support WebAuthn and implementing an automated workflow that leads a WebAuthn request through the process of authentication.

In some embodiments, mobile client device 130 may be programmed to use orchestrating system 140 to perform origin check 244 for request 202. In particular, orchestrating system 140 may be used to origin bind request 202 to determine a first verification indication by verifying an origin header 246 of request 202 matches a plurality of trusted URLs 248. In some embodiments, mobile client device 130 may be programmed to generate an information webpage associated with request 202 which is served to user 102 to collect a valid user credential to approve the authentication for request 202. In particular, an attacker may create a phishing campaign where the victim, such as user 102, successfully logs into a remote service but the attacker may intercept the victim's network and retrieve the user credential in an AITM attack. In order to prevent the AITM attack, orchestrating system 140 may be used to perform proximity check 250 to determine a second verification indication by verifying that mobile client device 130 is co-located or is the same device as the user credential or device approving the authentication. When both the first and second verification indications are received by mobile client device 130, mobile client system 130 may authenticate the WebAuthn request. Thus, request control system 200 may implement orchestrating system 140 to provide that the WebAuthn request is coming from the same physical device which provides proof of proximity. Therefore, request control system 200 may effectively prevent AITM attacks by verifying that mobile client system 130 is the same device as the device approving the authentication. Also, request control system 200 may be used to verify that request 202 is originated from a trusted domain, and not a fake domain. As a result, request control system 200 may collect data for user 102 and report improved telemetry for access devices by collecting the data from the mobile application.

In some embodiments, in response to receiving the challenge associated with the particular WebAuthn request, such as request 202, orchestrating system 140 may implement an authenticator 144 for user 102 to provide an WebAuthn credential, such as user data 204, for approving the particular WebAuthn request. The WebAuthn credential is shared between different components of orchestrating system 140. Thus, orchestrating system 140 may use one or more native Application Programming Interfaces (APIs) to get an WebAuthn assertion, such assertions 254, associated with the WebAuthn protocol. Thus, orchestrating system 140 may post the WebAuthn assertion for validation. In response to determining the WebAuthn assertion is valid, orchestrating system 140 may check policies 256 associated with the particular WebAuthn request and approve the particular WebAuthn request.

In some embodiments, orchestrating system 140 may implement WebAuthn to stop an AITM attack, WebAuthn includes an API which allows a mobile server to register and authenticate a user using public key cryptography rather than a password. In particular. WebAutho may be configured to generate a user credential using a private-public key pair for a website. For example, a private key is stored on a mobile device, such as mobile client device 130, of the user. As another example, a public key and randomly generated credential identification are stored on the mobile server. The mobile server may validate the identity of the user by using the public key. However, WebAuthn may not be easily adopted for all browsers because the WebAutho protocol only supports certain platforms (e.g., Window 10 and Android), browsers (e.g., Microsoft Edge, Google Chrome, Mozilla Firefox, and Apple Safari), and authenticator transports (e.g., Universal Serial Bus (USB), Bluetooth Low Energy (BLE), and Near Field Communications (NFC)). Furthermore. traditional mobile operating systems may not provide a way to origin bind the authorization request, which opens an application out of the box.

In some embodiments, request control system 200 may be configured to use authentication prompt 230 of mobile client device 130 to choose an authentication method. Authentication prompt 230 may be a browser-based login to a web service or application, such an authentication prompt, of mobile client device 130. Thus, an end user, such as user 102, may use authentication prompt 230 of an access device, such as mobile client device 130, to generate an WebAuthn request, such as request 202. Authentication prompt 230 may include one or more authentication methods (e.g., a Push method, a Phone Call method, or a Passcode method, etc.), which user 102 may choose how to verify his/her identity each time user 102 logs in. For example, when user 102 chooses the Push method in authentication prompt 230, a push notification or link may be sent to the access device to push a login request to user 102. User 102 may review the login request and tap Approval to log in. As another example, when user 102 chooses the Phone Call method in authentication prompt 230, a phone call may be called back to the access device associated with user 102 to approve the authentication. As another example, when user 102 chooses the Passcode method in authentication prompt 230, a passcode may be generated by a hardware token or provided by an administrator and texted to the access device via Short Message/Messaging Service (SMS). User 102 may log in by using the received passcode. In some embodiments, the access device may be configured to implement an operating system 270 to choose to block access to applications from an invalid device, such as a personal device or a public device, which is against policies 256. Thus, user 102 may complete authentication from a valid device.

In some embodiments, request control system 200 may be configured to use orchestrating system 140 of mobile client device 130 to provide an improved authentication method by using Origin Binding to provide protections against AITM attacks. Orchestrating system 140 may implement orchestrating system 140 to determine if the WebAuthn request is from a trusted domain. In response to receiving the WebAuthn request, authentication prompt 230 may send a link to orchestrating system 140 for opening a mobile application together with a flag for starting a server, such as server 240. In response to receiving the flag, orchestrating system 140 may trigger an authentication process using one or more authenticators 144, such as two-factor authentication. As a result, the end user may receive a login request based on the authentication method which he/she choose in authentication prompt 230. The end user may use the access device to approve the authentication by providing a user credential, such as user data 204, during the authentication process. For example, orchestrating system 140 may be used to check an origin header 246 associated with the WebAuthn request. Thus, orchestrating system 140 may determine if the origin header 246 matches a trusted URL 248 based on one or more policies 256. In response to determining the origin header 246 does not match the trusted URL 248, orchestrating system 140 may reject the WebAuthn request.

In some embodiments, in response to determining origin header 246 matches the trusted URL 248, orchestrating system 140 may be configured to further perform proximity check 250 by verifying the proximity of the access device associated with the WebAuthn request. In particular, orchestrating system 140 may determine that the access device is co-located with or is the same user device approving the authentication. For example, orchestrating system 140 may determine that the WebAuthn request comes from the same physical user device approving the authentication. In response to determining that the access device is the same user device approving the authentication, orchestrating system 140 may validate the WebAuthn request for the end user. In response to determining that the access device is not the same user device approving the authentication, orchestrating system 140 may reject the WebAuthn request. As a result, request control system 200 may use Origin Binding to verify that the WebAuthn request comes from a trusted domain, and not a fake domain. Likewise, request control system 200 may use Origin Binding to validate the WebAuthn request to prevent AITM attacks by verifying that the access device is the same device as the user device approving the authentication. Thus, server 240 may send information, such as messages 264 and responses 266, associated with the challenge for the WebAuthn request, to authentication prompt 230 which sends an authentication success to user 102.

Although FIG. 2 illustrates a particular number of users 102, mobile client systems 130, orchestrating systems 140, web browsers 142, authenticators 144, requests 202, user data 204, authentication prompts 230, servers 240, origin headers 246, trusted URLs 248, proximity checks 250, assertions 254, policies 256, challenge functions 260, challenges 262, messages 264, responses 266, and operating systems 270, this disclosure contemplates any suitable number of users 102, mobile client systems 130, orchestrating systems 140, web browsers 142, authenticators 144, requests 202, user data 204, authentication prompts 230, servers 240, origin headers 246, trusted URLs 248, proximity checks 250, assertions 254, policies 256, challenge functions 260, challenges 262, messages 264, responses 266, and operating systems 270. For example, orchestrating system 140 may perform Origin Binding for one or more requests 202 from user 102.

Although FIG. 2 illustrates a particular arrangement of user 102, mobile client system 130, orchestrating system 140, web browsers 142, authenticators 144, request 202, user data 204, authentication prompt 230, server 240, origin header 246, trusted URLs 248, proximity check 250, assertions 254, policies 256, challenge function 260, challenges 262, messages 264, responses 266, and operating system 270, this disclosure contemplates any suitable arrangement of user 102, mobile client system 130, orchestrating system 140, web browsers 142, authenticators 144, request 202, user data 204, authentication prompt 230, server 240, origin header 246, trusted URLs 248, proximity check 250, assertions 254, policies 256, challenge function 260, challenges 262, messages 264, responses 266, and operating system 270.

Although FIG. 2 describes and illustrates particular components, devices, or systems carrying out particular actions, this disclosure contemplates any suitable combination of any suitable components, devices, or systems carrying out any suitable actions. For example, orchestrating system 140 may perform Origin Binding for one or more requests 202 from user 102.

Figure 3:
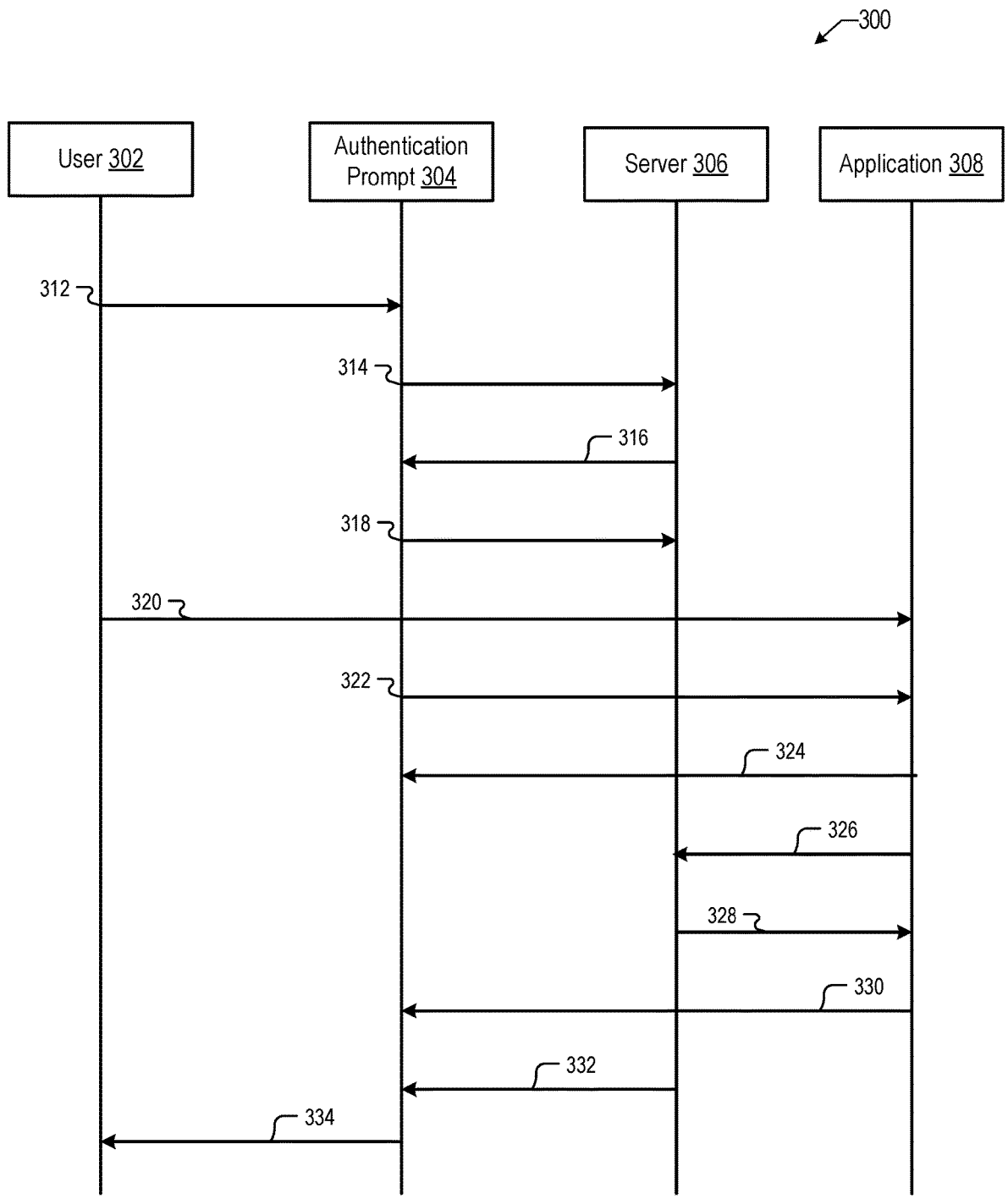
FIG. 3 illustrates a signaling diagram for implementing a request control system for managing an authentication request, in accordance with certain embodiments.

FIG. 3 illustrates an example signaling diagram 300 for implementing a request control system for managing an authentication request, in accordance with certain embodiments. Signaling diagram 300 includes a user 302, an authentication prompt 304, a server 306, and an application

308. For example, authentication prompt 304 may include an interactive, browser-based authentication interface. As another example, server 306 may be a cloud service. User 302 may send an authentication request 312, such as an WebAuthn request, to authentication prompt 304 using an access device. Upon the receipt of authorization request 312, authentication prompt 304 may detect if WebAuthn is unavailable for the web browser. Furthermore, authentication prompt 304 may be configured to generate a signal 314 to the operating system to fetch a challenge from server 306. For example, the challenge may be a series of electronic messages, the timing and content of which are mediated by programmed algorithms. As another example, the challenge may include a buffer of cryptographically random bytes generated on server 306. The challenge may be unique for each WebAuthn request to prevent relay attacks. In some embodiments, server 306 may use a challenge management system with automated messaging and a response system to generate the challenge.

In some embodiments, authentication prompt 304 may initiate the challenge by interactively communicating with the challenge management system of server 306, to manage one or more messages and responses associated with the challenge. The challenge may include an origin header which includes an origin string of the authentication request. Thus, server 306 may be configured to generate a signal 316 to the operating system to return the challenge associated with the authentication request to authentication prompt 304. In response to receiving the challenge from server 306, authentication prompt 304 may be configured to generate a signal 318 to the operating system to communicate with server 306 to subscribe to all challenges in server 306 and communicate a subscribe waiting for response for the authentication request.

In some embodiments, authentication prompt 304 may wait for the response from server 306 for the challenge associated with the authentication request. When the web browser supports WebAuthn, authentication prompt 304 may be configured to use WebAuthn to authenticate the authentication request. When the web browser does not support WebAuthn, authentication prompt 304 may be configured to generate a signal 320 to the operating system to open an orchestrating system, such as application 308, in order to implement an automated workflow that leads the authentication request through a process of authentication. In particular, authentication prompt 304 may be configured to generate a signal 322 to the operating system to ping application 308 over a localhost, providing the challenge. Application 308 may be configured to generate a signal 324 to the operating system to communicate a response to authentication prompt 304 in order to indicate that the ping is successfully received. Thus, application 308 may be configured to generate a signal 324 to the operating system to origin bind the authentication request using the challenge associated with the authentication request. For example, application 308 may verify an origin header associated with the authentication request to prevent phishing. In particular, application 308 may determine if the origin header matches a trusted URL in a trusted domain. In response to determining the origin header matches the trusted URL, application 308 may be configured to further verify proximity of the access device associated with the authentication request.

In some embodiments, in response to receiving the challenge, application 308 may implement an authenticator for user 302 to provide an WebAuthn credential for approving the authentication request. The WebAuthn credential is shared between authentication prompt 304, server 306, and application 308. Thus, application 308 may be programmed to generate a signal 326 to use one or more native APIs to get an WebAuthn assertion and post the WebAuthn assertion to server 306 for validation. Server 306 may validate the WebAuthn assertion. Likewise, server 306 may optionally check one or more policies associated with the authentication request. In response to determining the WebAuthn assertion is valid, server 306 may be programmed to generate a signal 328 to the operating system to communicate a response to application 308 indicating a success. As a result, application 308 may be programmed to generate a signal 330 to the operating system to return user 302 to authentication prompt 304. Server 306 may be programmed to generate a signal 332 to the operating system to publish a response for subscribe to authentication prompt 304. Authentication prompt 304 may be programmed to generate a signal 334 to the operating system to communicate the authentication success to user 302 which concludes the authentication process for the authentication request from user 302.

Figure 4:
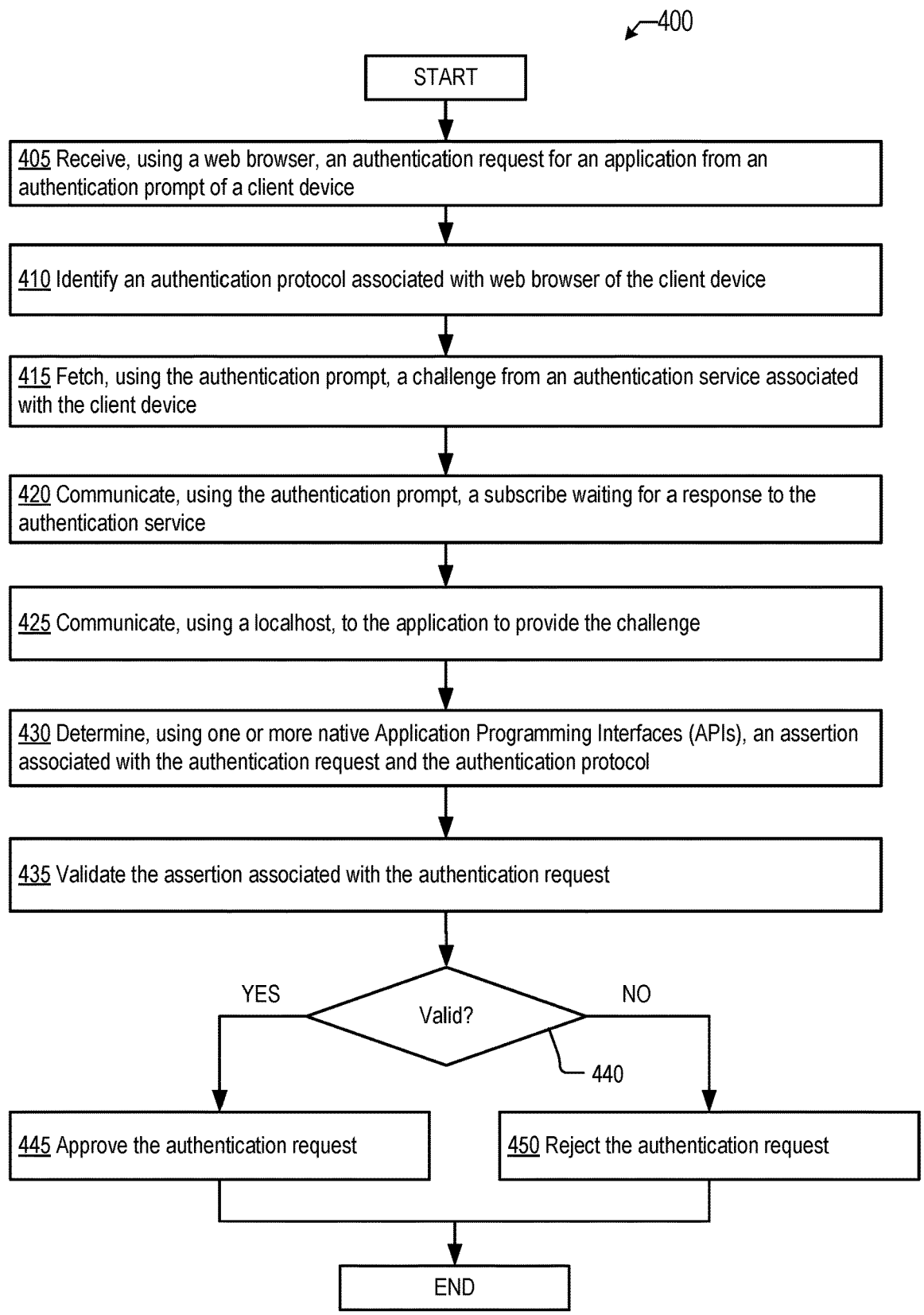
FIG. 4 illustrates a method for managing an authentication requests using an orchestrating system, in accordance with certain embodiments.

FIG. 4 illustrates an example method 500 for managing an authentication requests using an orchestrating system, in accordance with certain embodiments. Method 400 of FIG. 4 may be used by request control system 200 of FIG. 2. Method 400 starts at step 405, where request control system 200 (referring to FIG. 2) may be programmed to use a web browser to receive an authorization request for an application from an authentication prompt of a client device for a user. For example, the authentication prompt may include an interactive, browser-based authentication interface. As another example, the authentication request may be generated using a WebAuthn protocol associated with the client device.

At step 410, request control system 200 (referring to FIG. 2) may be programmed to identify an authentication protocol associated with the web browser of the client device. For example, the authentication protocol may be an WebAuthn protocol.

At step 415, request control system 200 (referring to FIG. 2) may be programmed to use the authentication prompt to fetch a challenge from an authentication service, such as a server, associated with the client device. In some embodiments, the authentication service may use a challenge management system with automated messaging and a response system to generate a response and return the response to the authentication prompt.

At step 420, request control system 200 (referring to FIG. 2) may be programmed to use the authentication prompt to communicate a subscribe waiting for a response to the authentication service. Thus, in response to receiving a response associated with the challenge from the authentication service, the user may open the application.

At step 425, request control system 200 (referring to FIG. 2) may be programmed to use a localhost to communicate to the application to provide the challenge. For example, request control system 200 (referring to FIG. 2) may implement the authentication prompt to ping the application over the localhost, providing the challenge. The application may be used to communicate a response to the authentication prompt, indicating that the ping is successfully received.

At step 430, request control system 200 (referring to FIG. 2) may be programmed to use one or more native APIs to determine an assertion associated with the authentication request and the authentication protocol. In particular, request control system 200 (referring to FIG. 2) may be programmed to origin bind the authentication request using the challenge associated with the authentication request. For example, request control system 200 (referring to FIG. 2) may be programmed to verify an origin header of the challenge associated with the authentication request to prevent phishing by determining if the origin header matches a trusted URL in a trusted domain. In response to determining the origin header matches the trusted URL, request control system 200 (referring to FIG. 2) may be programmed to implement an authenticator for the user to provide a credential for approving the authentication request and verify proximity of the client device associated with the authentication request. Thus, request control system 200 (referring to FIG. 2) may be programmed to use one or more native APIs to generate the assertion associated with the authentication request and post the assertion to authentication service for validation. The assertion may contain one or more basic array buffers which may include a representation of what the web browser sees when being asked to authenticate, data created and/or used by the authenticator, a signature which is verified with the public key that is created during registration, and/or a user identifier.

At step 435, request control system 200 (referring to FIG. 2) may be programmed to validate the assertion associated with the authentication request.

At step 440, a determination is made whether the assertion is valid. In particular, request control system 200 (referring to FIG. 2) may be programmed to optionally check one or more policies associated with the authentication request. Where the assertion is valid, the process may proceed to step 445. Where the assertion is invalid, the process may proceed to step 450. At step 445, request control system 200 (referring to FIG. 2) may approve the authorization request. At step 450, request control system 200 (referring to FIG. 2) may reject the authorization request.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method to manage an authentication requests using an orchestrating system, including the particular steps of the method of FIG. 4, this disclosure contemplates any suitable method including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
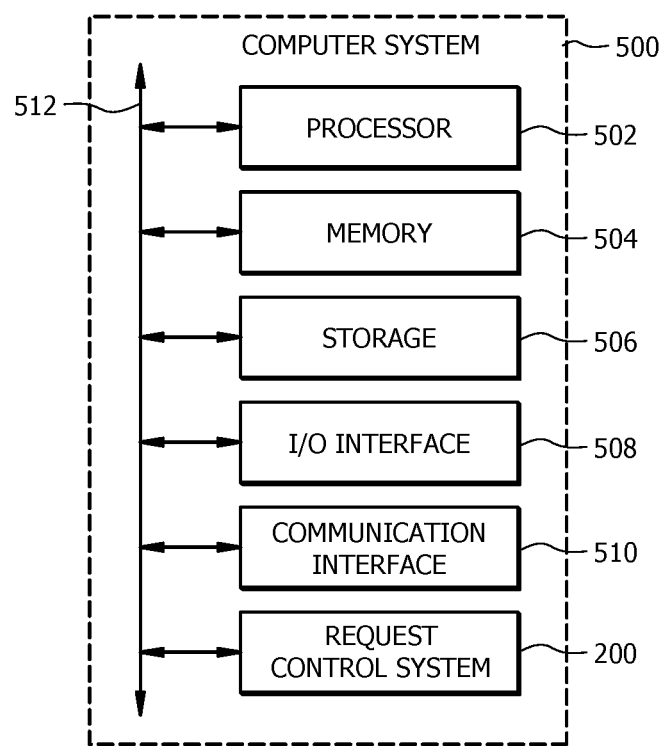
FIG. 5 illustrates a computer system, in accordance with certain embodiments.

FIG. 5 illustrates an example computer system, in accordance with certain embodiments. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to an information handling system may encompass a computer or a computing device, and vice versa, where appropriate. Moreover, reference to an information handling system may encompass one or more computer systems, where appropriate. Further, the request control system in FIG. 2 may be incorporated into the illustrated computer system 500. With reference to the present disclosure, computer system 500 may be the aforementioned product incorporating request control system in FIG. 2, as described above with respect to FIG. 2. As such, "product" and "computer system 500" may herein be used interchangeably.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific Ics (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In an embodiment, computer system 500 may be configured to implement a request control process (see FIG. 2) to register, manage, and authenticate users. In an embodiment, computer system 500 may be configured to use a web browser to receive an authentication request for an application from an authentication prompt of a client device. In an embodiment, computer system 500 may be configured to identify an authentication protocol associated with the web browser of the client device. In an embodiment, computer system 500 may be configured to use the authentication prompt to fetch a challenge from an authentication service associated with the client device. In an embodiment, computer system 500 may be configured to use the authentication prompt to communicate a subscribe waiting for a response to the authentication service. In an embodiment, computer system 500 may be configured to use a localhost to communicate to the application to provide the challenge. In response to receiving the challenge, computer system 500 may be configured to use one or more native APIs to determine an assertion associated with the authentication request and the authentication protocol. In an embodiment, computer system 500 may be configured to validate the assertion associated with the authentication request. In response to determining the assertion is valid, computer system 500 may be configured to approve the authentication request.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments disclosed herein include a method, an apparatus, a storage medium, a system and a computer program product, wherein any feature mentioned in one category, e.g., a method, can be applied in another category, e.g., a system, as well.

What is claimed is:

1. An apparatus, comprising:
one or more processors; and
one or more computer-readable non-transitory storage media comprising instructions that, when executed by the one or more processors, cause one or more components of the apparatus to perform operations comprising:
receiving, using a web browser, an authentication request for an application from an authentication prompt of a client device;
identifying an authentication protocol associated with the web browser of the client device;
fetching, using the authentication prompt, a first challenge from an authentication service associated with the client device;
communicating, using the authentication prompt, a subscribe to the authentication service;
communicating, using a localhost, to the application to provide the first challenge;
in response to receiving the first challenge;
determining, using one or more native Application Programming Interfaces (APIs), an assertion associated with the authentication request and the authentication protocol; and
validating an origin header of the authentication request from the client device based on a plurality of Uniform Resource Locators (URLs) in a trusted domain;
validating the assertion associated with the authentication request; and
in response to determining the assertion is valid, approving the authentication request.

2. The apparatus of claim 1, the operations further comprising:
in response to determining the assertion is invalid, rejecting the authentication request.

3. The apparatus of claim 1, the operations further comprising:
in response to determining the origin header of the authentication request is valid, obtaining a credential associated with the authentication request from the client device; and determining the assertion associated with the authentication request.

4. The apparatus of claim 1, the operations further comprising:
in response to determining the origin header of the authentication request is invalid, rejecting the authentication request.

5. The apparatus of claim 1, the operations further comprising:
in response to receiving the authentication request, determining an availability of the authentication protocol associated with the web browser of the client device; and
in response to determining that the authentication protocol is unavailable:
receiving, using an authentication prompt, a second challenge to an authentication service;
communicating, using an authentication service, the second challenge to the authentication prompt; and
communicating, using the authentication prompt, the subscribe to the authentication service.

6. The apparatus of claim 1, the operations further comprising:
in response to determining the assertion is valid, checking, using the authentication service, one or more policies associated with the authentication request; and
in response to determining the one or more policies are valid, communicating, using the authentication service, a response of success to the authentication prompt of the client device.

7. A computer-implemented method, comprising:
receiving, using a web browser, an authentication request for an application from an authentication prompt of a client device;
identifying an authentication protocol associated with the web browser of the client device;
fetching, using the authentication prompt, a first challenge from an authentication service associated with the client device;
communicating, using the authentication prompt, a subscribe to the authentication service;
communicating, using a localhost, to the application to provide the first challenge;
in response to receiving the first challenge;
determining, using one or more native Application Programming Interfaces (APIs), an assertion associated with the authentication request and the authentication protocol; and
validating an origin header of the authentication request from the client device based on a plurality of Uniform Resource Locators (URLs) in a trusted domain;
validating the assertion associated with the authentication request; and
in response to determining the assertion is valid, approving the authentication request.

8. The computer-implemented method of claim 7, further comprising:
in response to determining the assertion is invalid, rejecting the authentication request.

9. The computer-implemented method of claim 7, further comprising:
in response to determining the origin header of the authentication request is valid, obtaining a credential associated with the authentication request from the client device; and determining the assertion associated with the authentication request.

10. The computer-implemented method of claim 7, further comprising:
in response to determining the origin header of the authentication request is invalid, rejecting the authentication request.

11. The computer-implemented method of claim 7, further comprising:
in response to receiving the authentication request, determining an availability of the authentication protocol associated with the web browser of the client device; and
in response to determining that the authentication protocol is unavailable:
receiving, using an authentication prompt, a second challenge to an authentication service;
communicating, using an authentication service, the second challenge to the authentication prompt; and
communicating, using the authentication prompt, the subscribe to the authentication service.

12. The computer-implemented method of claim 7, further comprising:
in response to determining the assertion is valid, checking, using the authentication service, one or more policies associated with the authentication request; and
in response to determining the one or more policies are valid, communicating, using the authentication service, a response of success to the authentication prompt of the client device.

13. A non-transitory computer-readable medium comprising instructions that are configured, when executed by a processor, to perform operations comprising:
receiving, using a web browser, an authentication request for an application from an authentication prompt of a client device;
identifying an authentication protocol associated with the web browser of the client device;
fetching, using the authentication prompt, a first challenge from an authentication service associated with the client device;
communicating, using the authentication prompt, a subscribe to the authentication service;
communicating, using a localhost, to the application to provide the first challenge;
in response to receiving the first challenge;
determining, using one or more native Application Programming Interfaces (APIs), an assertion associated with the authentication request and the authentication protocol; and
validating an origin header of the authentication request from the client device based on a plurality of Uniform Resource Locators (URLs) in a trusted domain;
validating the assertion associated with the authentication request; and
in response to determining the assertion is valid, approving the authentication request.

14. The non-transitory computer-readable medium of claim 13, wherein the instructions are further configured to perform operations further comprising:
in response to determining the assertion is invalid, rejecting the authentication request.

15. The non-transitory computer-readable medium of claim 13, wherein the instructions are further configured to perform operations further comprising:

in response to determining the origin header of the authentication request is valid, obtaining a credential associated with the authentication request from the client device; and determining the assertion associated with the authentication request; and in response to determining the origin header of the authentication request is invalid, rejecting the authentication request.

16. The non-transitory computer-readable medium of claim 13, wherein the instructions are further configured to perform operations further comprising:

in response to receiving the authentication request, determining an availability of the authentication protocol associated with the web browser of the client device; and in response to determining that the authentication protocol is unavailable:

receiving, using an authentication prompt, a second challenge to an authentication service;

communicating, using an authentication service, the second challenge to the authentication prompt; and communicating, using the authentication prompt, the subscribe to the authentication service.

17. The non-transitory computer-readable medium of claim 13, wherein the instructions are further configured to perform operations further comprising:

in response to determining the assertion is valid, checking, using the authentication service, one or more policies associated with the authentication request; and in response to determining the one or more policies are valid, communicating, using the authentication service, a response of success to the authentication prompt of the client device.

* * * * *